(12) United States Patent
Kritchman et al.

(10) Patent No.: US 7,364,686 B2
(45) Date of Patent: Apr. 29, 2008

(54) SYSTEM AND METHOD FOR PRINTING AND SUPPORTING THREE DIMENSIONAL OBJECTS

(75) Inventors: Eli Kritchman, Tel Aviv (IL); Hanan Gothait, Rehovot (IL); Gershon Miller, Rehovot (IL)

(73) Assignee: Objet Geometries Ltd., Rehovot (IL)

( * ) Notice: Subject to any disclaimer, the term of this patent is extended or adjusted under 35 U.S.C. 154(b) by 275 days.

(21) Appl. No.: 10/716,426

(22) Filed: Nov. 20, 2003

(65) Prior Publication Data

US 2004/0207124 A1    Oct. 21, 2004

Related U.S. Application Data

(63) Continuation of application No. 10/101,089, filed on Mar. 20, 2002, now abandoned.

(60) Provisional application No. 60/277,259, filed on Mar. 21, 2001.

(51) Int. Cl.
*B29C 35/08* (2006.01)
*B29C 41/02* (2006.01)

(52) U.S. Cl. .................. 264/494; 264/308

(58) Field of Classification Search ............... 264/308, 264/401, 497, 494
See application file for complete search history.

(56) References Cited

U.S. PATENT DOCUMENTS

| | | | |
|---|---|---|---|
| 4,575,330 A | 3/1986 | Hull | |
| 5,136,515 A | 8/1992 | Helinski | |
| 5,192,559 A * | 3/1993 | Hull et al. | 425/89 |
| 5,204,055 A | 4/1993 | Sachs et al. | |
| 5,216,616 A | 6/1993 | Masters | |
| 5,263,130 A | 11/1993 | Pomerantz et al. | |
| 5,287,435 A | 2/1994 | Cohen et al. | |
| 5,340,433 A | 8/1994 | Crump | |
| 5,387,380 A | 2/1995 | Cima et al. | |
| 5,503,785 A * | 4/1996 | Crump et al. | 264/40.7 |
| 5,594,652 A | 1/1997 | Penn et al. | |
| 5,598,340 A | 1/1997 | Medard et al. | |
| 5,695,707 A | 12/1997 | Almquist et al. | |
| 5,695,708 A | 12/1997 | Karp et al. | |

(Continued)

FOREIGN PATENT DOCUMENTS

DE       19537264 A1 *   4/1997

(Continued)

OTHER PUBLICATIONS

Three Dimensional Printing: What is 3DP?, http://web.mit.edu/afs/athen/org/t/tdp/www, undated.

(Continued)

*Primary Examiner*—Leo B. Tentoni
(74) *Attorney, Agent, or Firm*—Pearl Cohen Zedek Latzer, LLP

(57) ABSTRACT

A method for printing and supporting a three-dimensional (3-D) object is provided. The method of printing can include dispensing a first interface material for the construction of the three-dimensional object, dispensing a second interface material to form a support structure for supporting the three-dimensional object and dispensing a third interface material which may be used to separate the support structure from the 3-D object Disclosed also a method for producing a 3-D model containing various kinds of inserts.

17 Claims, 6 Drawing Sheets

U.S. PATENT DOCUMENTS

| | | |
|---|---|---|
| 5,717,599 A | 2/1998 | Menhennett et al. |
| 5,784,279 A | 7/1998 | Barlage, III et al. |
| 5,902,537 A | 5/1999 | Almquist et al. |
| 5,943,235 A | 8/1999 | Earl et al. |
| 6,030,199 A | 2/2000 | Tseng |
| 6,136,252 A | 10/2000 | Bedal et al. |
| 6,193,923 B1 | 2/2001 | Leyden et al. |
| 6,259,962 B1 | 7/2001 | Gothait |
| 6,347,257 B1 | 2/2002 | Bedal et al. |
| 6,364,986 B1 * | 4/2002 | Kieronski ............... 156/242 |
| 6,490,496 B1 | 12/2002 | Dacey |
| 6,508,971 B2 | 1/2003 | Leyden et al. |
| 6,532,394 B1 | 3/2003 | Earl et al. |
| 6,569,373 B2 * | 5/2003 | Napadensky ............ 264/401 |
| 6,658,314 B1 | 12/2003 | Gothait |
| 2002/0011693 A1 | 1/2002 | Leyden et al. |

FOREIGN PATENT DOCUMENTS

| | | |
|---|---|---|
| EP | 0 470 705 A2 | 2/1992 |
| EP | 0 852 536 B1 | 9/2002 |
| WO | WO 97/31781 A1 | 9/1997 |
| WO | WO 01/26023 A1 | 4/2001 |

OTHER PUBLICATIONS

Z Corporation, News Release, "Z Corp. Debuts Robust New Materials System", Apr. 2, 1998.

* cited by examiner

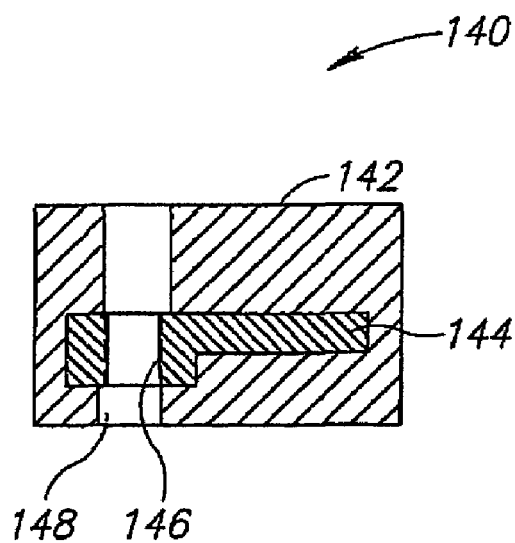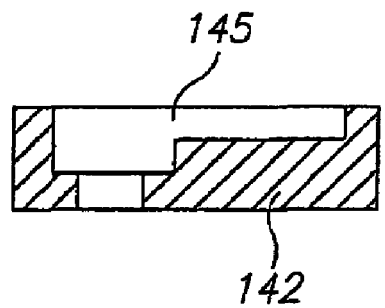
FIG.9A  FIG.9B
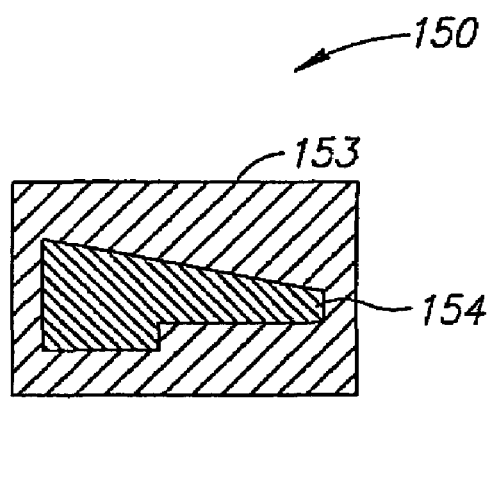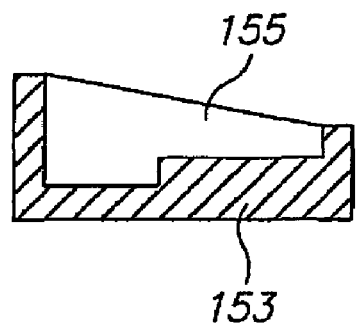
FIG.10A  FIG.10B

SYSTEM AND METHOD FOR PRINTING AND SUPPORTING THREE DIMENSIONAL OBJECTS

CROSS REFERENCE TO RELATED APPLICATIONS

This application is a continuation application of U.S. Ser. No. 10/101,089, filed on Mar. 20, 2002 and entitled. "SYSTEM AND METHOD FOR PRINTING AND SUPPORTING THREE DIMENSIONAL OBJECTS", now abandoned, which in turn claims priority from U.S. provisional application Ser. No. 60/277,259, filed on Mar. 21, 2001 and which are both incorporated in their entirety by reference herein.

FIELD OF THE INVENTION

This present invention relates to printing 3-D (Three-Dimensional) objects in general and to supporting complex 3-D structures in particular.

BACKGROUND OF THE INVENTION

3-D printing, which generally works by building parts in layers, is a process used for the building up of 3-D objects. 3-D printing is relatively speedy and flexible allowing for the production of various objects as prototype parts and tooling directly from, for example, a CAD (Computer Aided Design) file.

Using 3-D printing enables the manufacturer to obtain a full 3-D model of any proposed product before tooling thereby possibly substantially reducing the cost of tooling and leading to a better synchronization between design and manufacturing.

Embodiments for 3-D printing are described in U.S. patent application Ser. No. 09/259,323 assigned to the Assignees of the present application, and incorporated herein by reference. Such embodiments include a dispensing apparatus including a printing head having a plurality of nozzles, which selectively dispenses interface material through the nozzles in layers and curing means for optionally curing each of the layers deposited. The depth of each deposited layer may be controllable by selectively adjusting the output from each of the plurality of nozzles.

Embodiments for 3-D printing are also described in U.S. patent application Ser. No. 09/412,618. Some such embodiments include printing complex 3-D objects by using interface materials having different hardness or elasticity and mixing the interface material from each of the printing heads to control the hardness of the material forming the 3-D object.

SUMMARY OF THE INVENTION

Embodiments of the present invention provide a method and system for printing a 3-D (Three-Dimensional) object and supporting the 3-D object during its construction.

There is thus provided, in accordance with an embodiment of the present invention, a method and system of printing a 3-D object which includes the steps of dispensing a raw first interface material which will be referred to as building material, or briefly BM, directly to place for the construction of the 3-D object and (or not) for building part of the supporting structure of the 3-D object, dispensing a raw second interface material, which will be referred to as support material or briefly SM, to form the other part of the supporting structure, and applying a hardening process (e.g., curing) to the building and (or not) support materials. In addition, the immediate layer of a supporting structure that touches the 3-D object surface may be composed of support material only, so as to serve as a release layer between the 3-D object and the rest of the supporting structure.

In addition, there is thus provided a method of increasing the viscosity of the building and or support materials by reducing the temperature of the materials after dispensing.

In addition, there is thus provided a method of hardening the BM and (or not) SM by "curing" brought about by, for example, electromagnetic radiation to produce the (final) interface materials. Furthermore, in accordance with an embodiment of the present invention, the step of dispensing a BM includes the step of dispensing the BM in a plurality of layers, each layer being less than 10µ (micron) thick. The step of dispensing a SM includes the step of dispensing the raw SM in a plurality of layers, each layer being the same thickness as the layer of the BM.

Additionally, the step of dispensing the BM may include the step of dispensing the SM as well. the final SM (FSM) has a different viscosity or hardness or cohesiveness from the final BM (FBM).

In addition, there is thus provided a method of separating the support structure from the 3-D object thereby to produce the finished 3-D object. Further more, in accordance with an embodiment of the present invention, the step of separating includes the step of dissolving the FSM in a solvent.

Alternatively, the step of separating includes the step of subjecting the FSM to radiation thereby to cause the support structure or part of it to, for example, turn to gas or liquid or powder. The radiation includes electromagnetic radiation at microwave wavelength, sonic radiation at ultrasonic wavelength or low frequency mechanical vibration.

The FSM may be a fluid. In this case the step of separating includes the step of draining the FSM and/or washing the 3-D object with a solvent—in particular with water.

The fluid may have the proper characteristics that are required to prevent deterioration of surface quality of the 3-D object due to mix of BM and SM at the interface layer between both. Such characteristics include having large surface tension between both raw materials, or being the raw SM compatible with the BM in respect of the hardening process of the BM (example: BM without initiator is being used as SM).

The fluid may be soluble or dispersible in environmental friendly solvent or dispersant—in particular water. The fluid may be water or water solution or dispersion such as Poly Ethanol Glycol, Propylene Glycol, Glycerol.

Furthermore, in accordance with an embodiment of the present invention, the support structure includes a container retaining the non self sustaining SM. The container includes a plurality of walls everywhere the FSM is adjacent to air and (or not) to the table, including (or not) the air above the FSM.

The support structure may also include pillars and membranes that stabilize and support the 3-D object. A typical embodiment includes vertical pillars and horizontal membranes; each membrane is composed of one or few printed layers of BM, or BM, and SM. The membrane may be full or screen-like in such that it comprises of thin beams that connect the pillars to each other. The pillars and or membranes may or may not connect the 3-D object to the container's walls or base, or connect parts of the 3-D object to each other. The membranes also connect pillars to each other. The material of container, pillars and membranes may be viscous or cohesive and harder than the FSM material, and may be composed of, for example, FBM, or of a mix of BM and SM, or a separate material.

One special case of using horizontal membranes is when a layer includes an island. Island is defined as any part of the object, which is not connected to the object from beneath. The bottom part of the object is an example of an island. The membrane stretches out of the island circumference to a certain extent and is connected to the pillars from below, or is connected to the adjacent walls.

The support structure may also include a fine mix of BM and SM in a way that the mix is even substance with hardness, flexibility and cohesiveness between the fluid SM and the cured BM. One way of achieving such a mix is printing fine pillars of BM surrounded by SM. The support structure may also include a layer of SM between the 3-D object and the mixed substance for releasing purposes.

Furthermore, one edge of support pillar or membrane may contact or be adjacent to the 3-D object being supported. When in contact, the edge may be tapered or thinned.

There may be, for example, four sets of grids or membranes: Base, extra, island and fine. A base grid may be built where there is vertical "line of sight" to the table. An extra may be the grid of the extra support section. An island may be formed below islands and the very immediate vicinity. A fine grid may be formed elsewhere. The container and connecting walls may be formed in such a way that they are easily separable from the 3-D object. Hence they may be formed of thin layer of FBM, the layer may be reinforced by columns, or thick layer with thin "break lines" and sharp edges where the wall is connected to the object, or thick layer which is composed of a mix of BM and SM.

Furthermore the raw SM may be flooded into place instead of directly dispensed into place after or before the raw BM is dispensed into place.

Furthermore the 3-D object during printing may be partially sunk in a bath of raw SM, and the raw BM may be dispensed into place. After each slice (e.g., printed layer) the table supporting the object sinks so that only the very top of the printed object protrudes above the SM. The table may sink before this step even more in order to enable the SM flowing to any open space between the printed object parts.

Furthermore, in accordance with an embodiment of the present invention, the method further includes the steps of curing the BM for a first period of time and at a first electromagnetic radiation wavelength to obtain a first modulus of elasticity and curing or not the SM for a second period of time and at a second radiation wavelength to obtain a second modulus of elasticity. The radiation wavelength and time length of both may be equal.

Furthermore, in accordance with an embodiment of the present invention, a method of printing 3-D models containing various kinds inserts is presented.

These inserts may be rigid, semi-rigid or flexible and may be produced from various materials. The inserts may installed during the printing process as will be explained herein.

BRIEF DESCRIPTION OF THE DRAWINGS

The present invention will be understood and appreciated more fully from the following detailed description taken in conjunction with the appended drawings in which:

FIG. 4-B is an enlarged detail showing the support pillar for the 3-D object according to an embodiment of the present invention;

FIG. 4-C depicts another embodiment of a pillar end used to support a cantilever of a 3-D model according to an embodiment of the present invention;

FIG. 6-B is an plan view of a serration used to support a thin section of a model according to an embodiment of the present invention;

FIG. 8-B is the base of a part when an insert is introduced according to an embodiment of the present invention;

FIG. 9-A is a model containing an internal graduated insert according to an embodiment of the present invention;

FIG. 9-B is the lower section of part 140 when the insert is introduced according to an embodiment of the present invention;

FIG. 10-A is a model containing a skew insert according to an embodiment of the present invention; and FIG. 10-B is the lower section f part 150 when the skewed insert is inserted.

DETAILED DESCRIPTION OF THE PRESENT INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

List of Definitions:

The following definitions are used in this Application:

Object layer (or component) or model layer: a layer of BM (building material) included in the 3-D object;

Support layer (or component)—a layer of SM (support material) for supporting the 3-D object layer and not included in the 3-D object;

Release layer (or component)—a layer of interface material for separating the 3-D object layer from components, such as the support layer, not included in the 3-D object.

Figure 1:
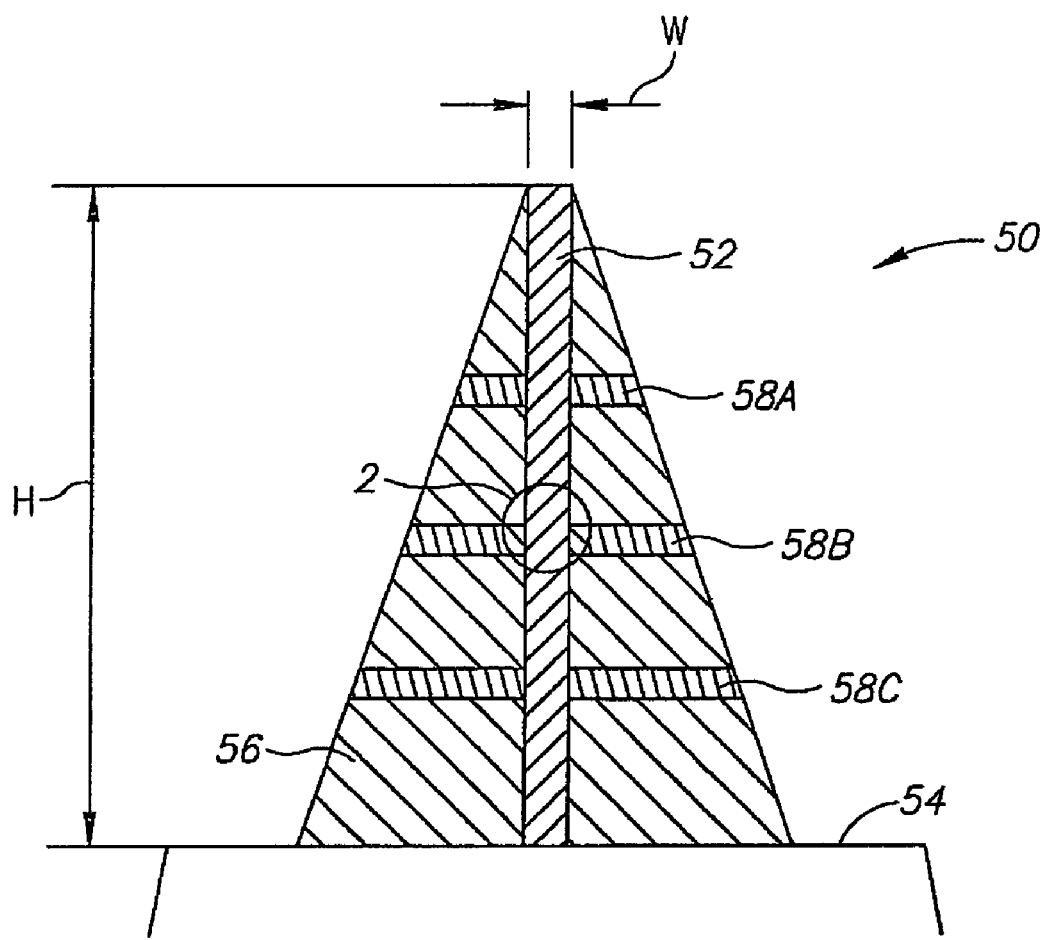
FIG. 1 is a schematic sectional elevational view of a release/support structure for use in the construction of a 3-D object, constructed and operative in accordance with a preferred embodiment of the present invention.

Reference is now made to FIG. 1, which is a schematic cross sectional view of a release/support structure according to an embodiment of the present invention, generally referenced 50, for a 3-D element 52 (shown hatched) being constructed. Element 52, set on a table 54, is shown as being a slim upright object having dimensions, whose height H is typically a large multiple of its width (W), In the example of FIG. 1, H≅15×W. Other dimensions and proportions may be used.

As will be appreciated, a slim upright object such as element 52 is likely to snap much more easily than a wider based object. Thus, in order to ensure that 3-D element does not break or snap during printing, 3-D element 52 may be supported during construction. Surrounding the 3-D element 52 may be a shaped support structure 50 that ensures that the 3-D object is adequately braced.

Element 52 is preferably constructed in layers, utilizing suitable apparatus such as embodiments described in U.S. patent application Ser. Nos. 09/259,323 and/or 09/412,618, assigned to the Assignees of the present application, and incorporated herein by reference. Other 3-D modeling apparatuses may be used. For clarity, only three layers, referenced 58A, 58B and 58C are shown. It will be appreciated that 3-D element 52 is constructed in a plurality of layers, approximately 10 μ-20 μ thick. Other dimensions may be used.

Figure 2:
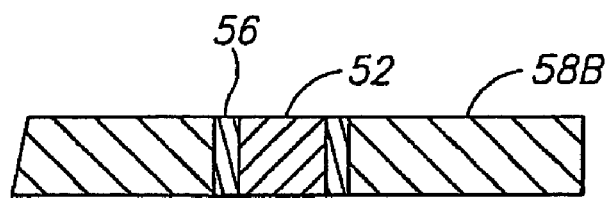
FIG. 2 is an enlarged detail of a layer of the 3-D object of FIG. 1.

As shown in the enlarged detail of layer 58 B in FIG. 2, each layer comprises support material 58, building material 52 and release material 56. Each of the support material 58, building material 52 and release material 56 may be, for example, a photopolymer or other substance that is curable. Curing may be done by, for example, electromagnetic radiation (e.g., X rays, UV rays, visible light, IR radiation, microwave radiation, radio frequencies, etc.). Other curing methods, such as electron beam curing, may be used. Different substances may be used, and different curing methods may be used.

Briefly, embodiments described in U.S. patent application Ser. No. 09/259,323 describe apparatus including a printing head having a plurality of nozzles, a dispenser connected to the printing head for selectively dispensing interface material in layers and curing apparatus for optionally curing each of the layers deposited. The depth of each deposited layer may be controllable by selectively adjusting the output from each of the plurality of nozzles.

Embodiments described in U.S. patent application Ser. No. 09/412,618 include a system and a method for printing complex 3-D objects by using interface material having different hardness or elasticity and mixing the interface material from each of the printing heads to control the hardness of the material forming the 3-D object.

Figure 3:
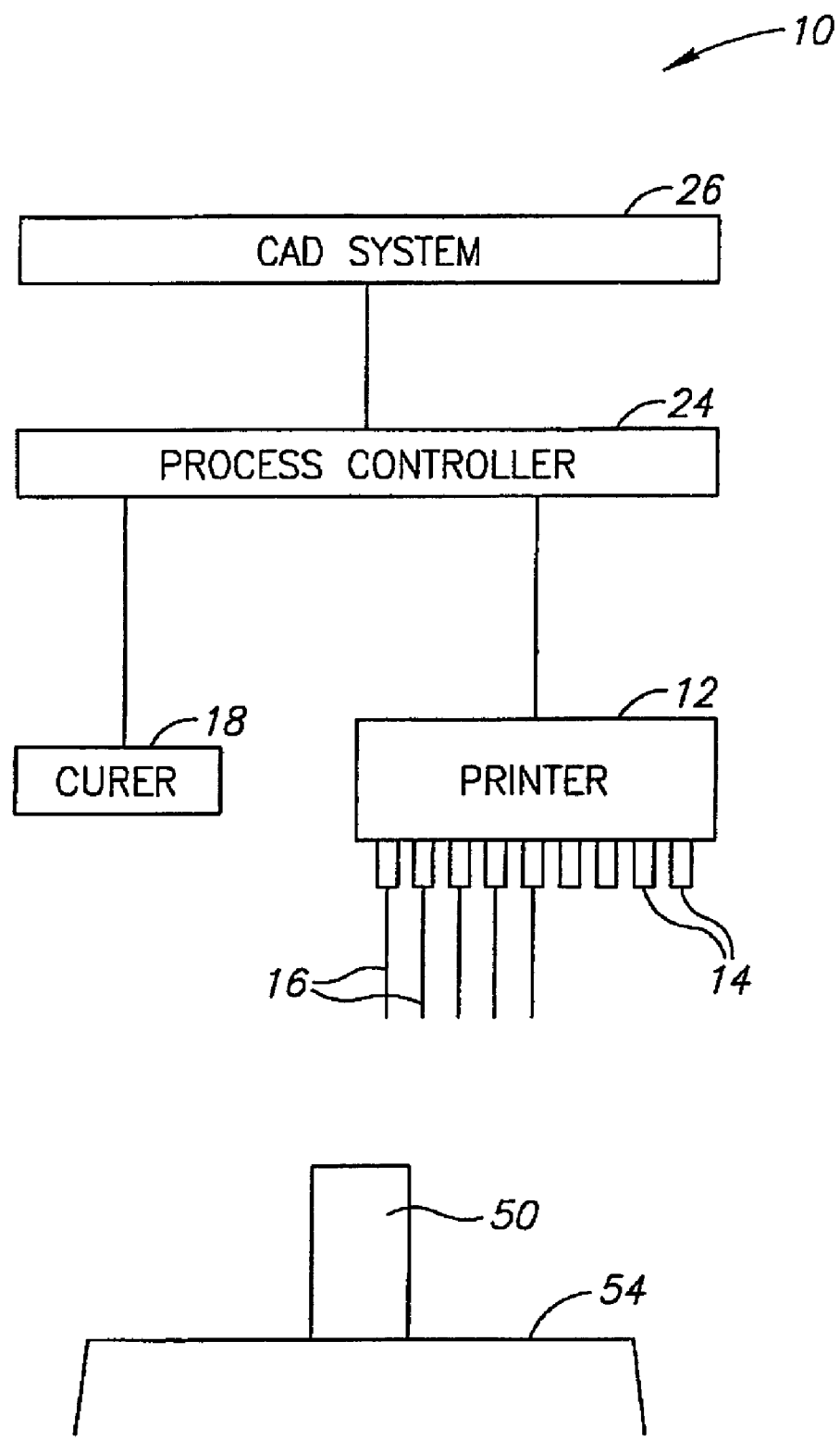
FIG. 3 is a schematic illustration of an embodiment of the 3-D printing system for use in constructing the 3-D object and release/support structure of FIG. 1.

Reference is now briefly made to FIG. 3, which is a schematic illustration of a 3-D printing system according to an embodiment of the present invention, generally designated 10.

In one embodiment, the 3-D printing system 10 includes a printing head 12 having a plurality of ink-jet nozzles 14, through which interface material 16 is jetted and a curing unit 18 for curing the interface material 16 to form the 3-D element 52. The 3-D printing system 10 further comprises a process controller 24 connected to and controlling the printing head 12 and curing unit 18 as well as to a CAD system 26. CAD system 26 prepares and outputs the data for the 3-D object being produced.

A single printing head 12 may be used for dispensing the building material 52, support material 58 and release material 56 by allocating different nozzles for each of the different materials. Alternatively, separate printing heads may be used for each material. The support layer may be constituted from, for example, a separate material, from the material used for the release layer, from a mixture of release layer material and support layer material, or from any suitable combination of materials having sufficient strength to provide support to the build layers.

The 3-D element 52 is build up in layers. In one embodiment, the depth of each layer is controllable by, for example, selectively adjusting the output from each of the plurality of ink-jet nozzles 14.

As described in U.S. patent application Ser. No. 09/412,618, an object can be supported during printing by concurrently printing support material using a mixture having a different hardness or elasticity from the mixture forming the 3-D element 52. Thus, in the example of FIG. 1, 3-D element 52 can be supported, for example, by a conical shaped support structure 50. The shaped support structure 50, is preferably constituted from material having mix proportions different from the constructed 3-D element 52.

In one embodiment, the shaped support structure 50 may be released by suitable means consistent with the composition of the support structure. For example, by dissolving shaped support structure 50 in water or other solvent, or by subjecting the structure to mechanical vibrations, or alternatively, subjecting the shaped support structure 50 to 'energy bombardment', such as from microwaves, which would cause the shaped support structure 50 to weaken; for example to turn to gas, liquid or powder.

Alternatively, in the embodiment shown in FIG. 2, release material 56 can be used to separate the build material from the support material 58B. The shaped support structure 50 may be constituted from material having mix proportions similar to the constructed 3-D element 52, provided that a release layer 56 is inserted between the shaped support structure 50 and the constructed 3-D element 52. In this case, the release layer is generally softer than both the shaped support structure 50 and the constructed 3-D element 52. The support structure 50 can then be easily separated from the 3-D element 52.

In one embodiment, the release layer has a modulus of elasticity different from those of the support structure and the build material (typically, when measured after deposition and possibly after curing, if curing is used). In certain embodiments, such modulus of elasticity may be measured after a weakening agent (e.g., solvent, radiation, temperature) is applied. Typically, the modulus of elasticity for the release layer is lower than both the support and release material (which may or may not have the same modulus of elasticity). The release layer may be constructed from, for example, a mix of support and build material, or may be constructed from a third, separate material.

Figure 4A:
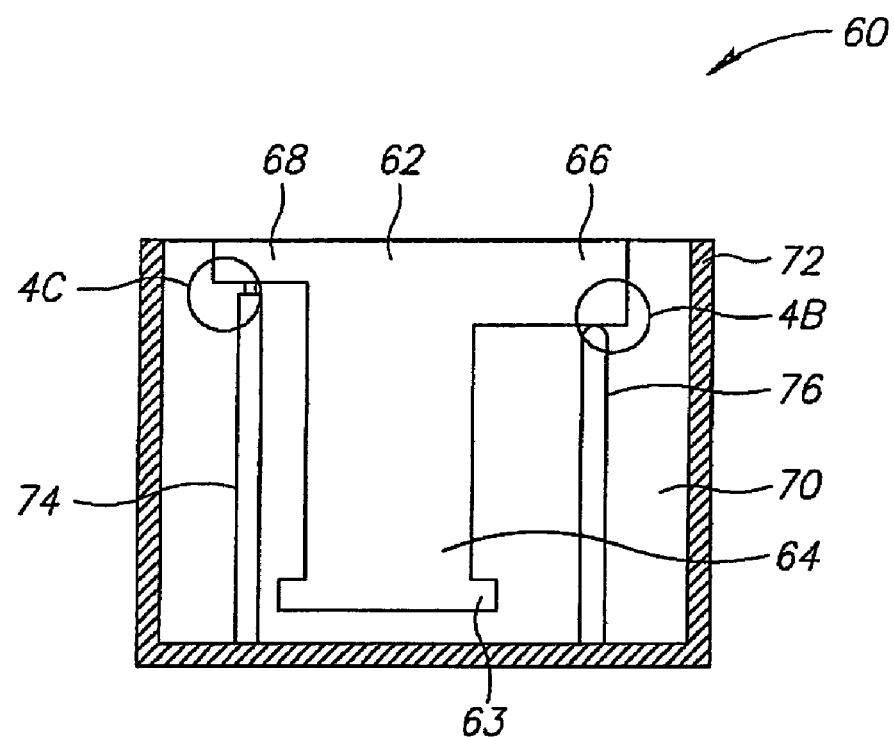
FIG. 4-A is a schematic cross-sectional elevational view of a further embodiment of release/support structure for a 3-D object.
Figure 4B:
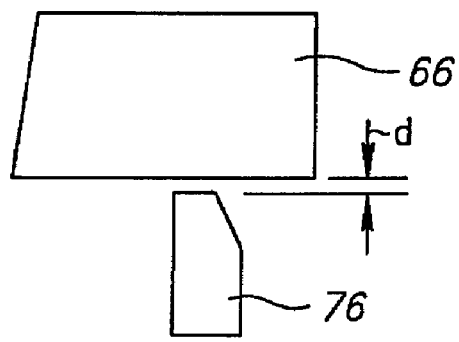
Figure 4C:
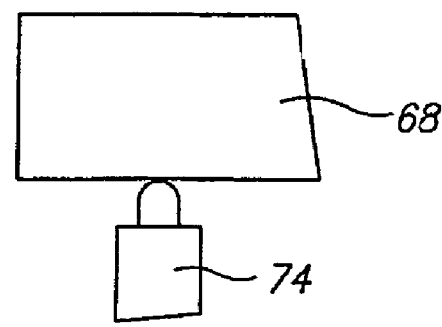

Reference is now made to FIG. 4-A which is a schematic cross-sectional view of a further embodiment of a release/support structure, generally referenced 60 for a more 'complex' 3-D element, 62. The example of 3-D element 62 may be described as having a generally "I"-shape (as seen in cross-section), having a 'fragile' foot 63 supporting a wider 'leg' 64, which further supports cantilever 'arms' 66 and 68. Cantilever arm 66 is deeper than cantilever arm 68. The structure 60 is supported by support material 70. Unless the support material 70 is itself adequately retained (or sufficiently dense so as to be self-supporting), the support material 70 may 'spread' or bulge thus causing both cantilever 'arms' 66 and 68 to sag or curl.

In the embodiment shown in FIG. 4-A, a secondary support, in the form of a container 72, is used. Container 72 may be a generally box-shaped structure having an open top, which may be jetted in the same manner as the 3-D element 62 and the support material 70. Other shapes for the container may be used. Container 72 may be constituted so that it is sufficiently strong to retain the support material 70. The use of container 72 enables the use of a semi-fluid material, for example, for the support material layers. Thus, the support material may be any suitable low viscosity material capable of supporting the 3-D object being produced. Using low viscosity material as the support allows the 3-D object to be easily released by simply upending the container 72, the support layer 70 also acting as a release material.

The support material typically has a modulus of elasticity less than that of the container and the build object (typically when measured after dispensing or after curing). The modulus of elasticity of the container and build object may be the same. The container 72 may be constructed layer by layer concurrently with the construction of the 3-D object 62 and the release/support 70, as described in U.S. patent application Ser. No. 09/259323. Other methods may be used.

Additional support pillars (74, 76) may be added during construction (if required) for supporting the overhangs formed from cantilever 'arms' 66 and 68. Reference is now made to FIG. 4-B, which is an enlarged detail of the corner of cantilever 'arm' 66 and support pillar 76 according to an embodiment of the present invention. Support pillar 76 may be constructed in layers during the construction of container 72. The support pillar 76 is shown as ending a distance 'd' below the bottom layer of cantilever 'arm' 66. The distance 'd' is preferably the thickness of one or two layers, that is 20-50 microns. Alternatively, the pillar 76 can be constructed up to the bottom layer of cantilever 'arm' 66, as shown in FIG. 4-C, the last layer being a single ink-jet 'drop'. Thus, the support pillar 76 acts to prevent the cantilever arm 66 from sagging. In the embodiment of FIG. 4-B, the maximum 'sag' is thus the distance 'd' (that is, 20-50 microns).

The last layers of the supporting pillar 76 just below the cantilever 'arm' 66 may be narrowed, as shown in FIG. 4-B. Alternative configurations for the last layers include a point or any suitable formation, as shown in FIG. 4-C, so as to ease breaking the support structure.

Figure 5:
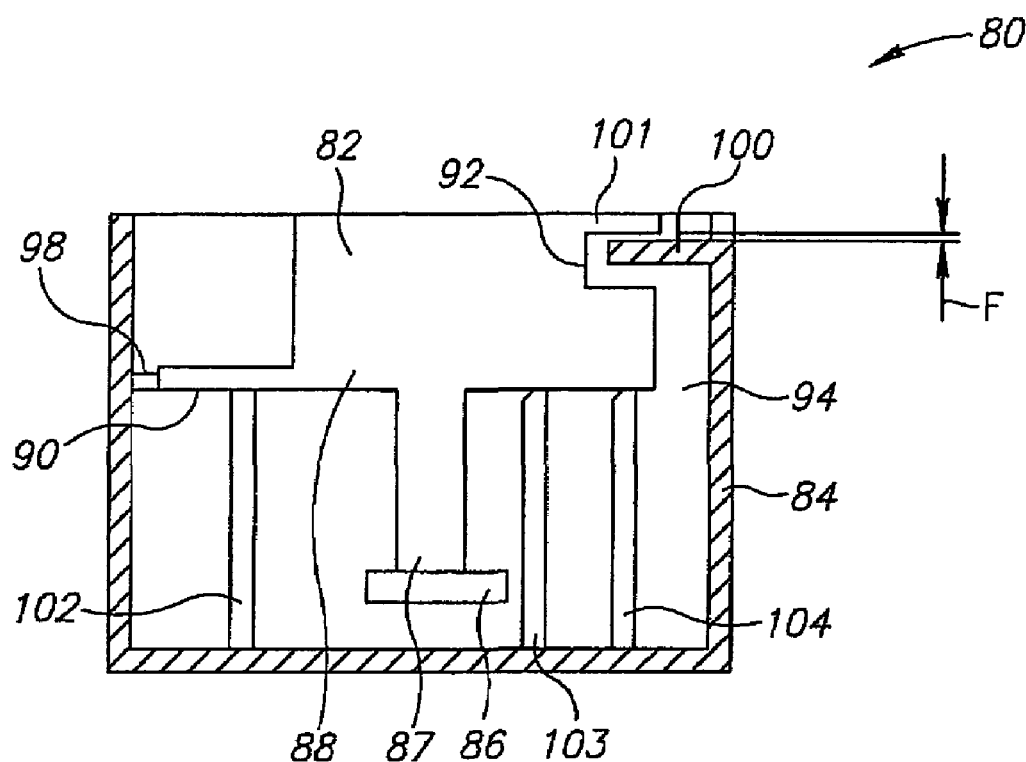
FIG. 5 depicts a schematic cross-sectional view of a yet further embodiment of release/support structure for a 3-D model.

Reference is now made to FIG. 5, which is a schematic cross-sectional view of a further embodiment of a release/support structure, generally referenced 80. In the embodiment of FIG. 5, a 'complex' 3-D structure, generally designated 82 is being constructed within a container-like retainer 84. The 3-D structure comprises a 'foot' 86 supporting a 'leg' 87, which supports an upper 'body' 88. Upper 'body' 88 further comprises a nib 90 and a 'mortise' 92 cut into one part of body 88. The material used to build the container may be, for example, the build material, or may be other material, such as a third material or a mix of BM and SM.

The structure 82 is supported by support material 94, which is similar to support material 70 described hereinabove with respect to FIG. 4-A.

Reference is now also made to FIG. 6, which is an enlarged detail of nib 90 according to an embodiment of the system and method of the present invention. Owing to thermal changes taking place during the construction of the interface material, there is a tendency for shrinkage to occur. The shrinkage, indicated by arrow 95, may cause 'curling' to occur at the ends of the layers being deposited. This is shown in exaggerated detail by the dashed lines 96. One technique to prevent 'curling' to occur is shown in the embodiment of FIGS. 6-A and 6-B, where the end of nib 90 is extended by disposing a few thin serrations 98, connected to the container-like retainer 84. The serrations 98 act as restraints, preventing the upward curling of the edges of the nib 90. Another technique of supporting a thin nib 102 at its lower side is shown in FIG. 5: dispensing a supporting nib 100 as an integral part of the container 84, leaving a thin gap 'F', and dispensing SM or a release layer over it enables the formation of the thin nib 102.

Similar to the embodiment of FIG. 4-A, additional support pillars (102, 103, 104) may be added during construction for supporting the nib 90 and the overhang formed from the upper 'body' 88. As described hereinabove with respect to the support pillar 76 of FIG. 4-A, support pillars (102, 103, 104) may be constructed in layers during the construction of container 84 ending a distance 'd; below the bottom layer of components 88 and 90, or ending by thinning or a point as shown in FIG. 4-B and 4-C.

Curing is preferably carried out after the deposition of each layer. However, alternatively, curing may be optionally deferred so that curing occurs after the deposition of more than one layer.

Figure 7:
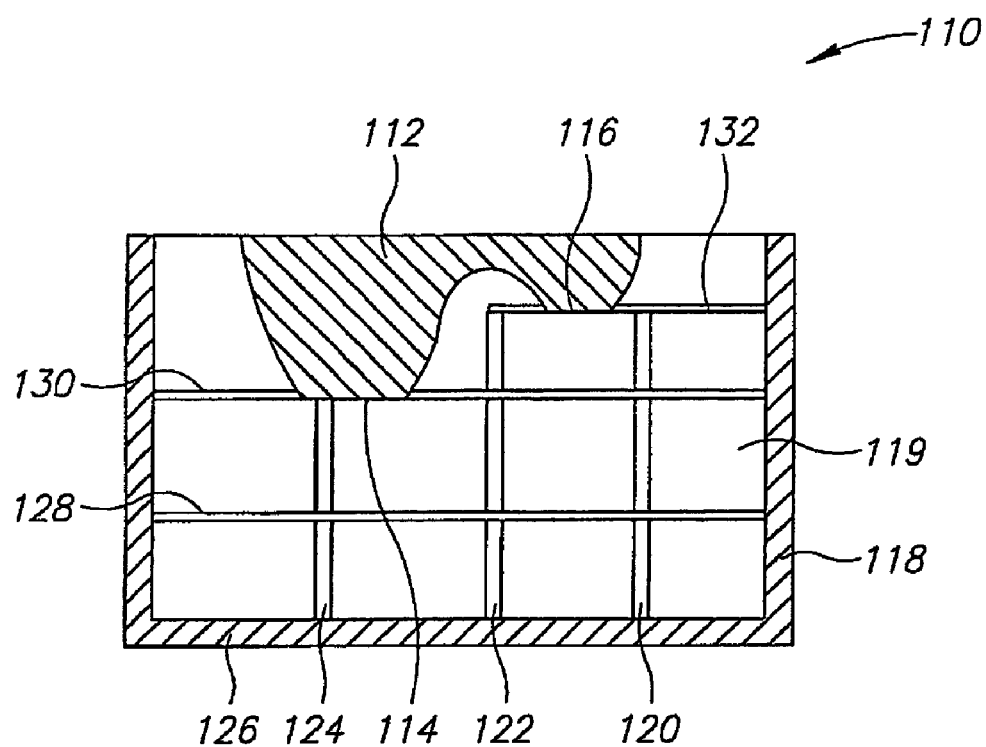
FIG. 7 is a complex of pillars and membranes used to support a printed model according to an embodiment of the present invention.

Reference is made now to FIG. 7, depicting a cross sectional view of a 3-D model 110 according to an embodiment of the present invention. According to this preferred embodiment the 3-D model 110 is constructed layer by layer including a container 118 and support material 119.

One or more pillars such as pillars 120, 122, and 124 may be constructed in order to support the islands 114 and 116. The pillars are preferably made from the building material, but may be constructed from other material.

Thin membranes like 128, 130, 132, typically having at least thickness of a single layer, may also be dispensed and cured. These membranes may be used to stabilize the pillars by forming connection among them and by connecting them to the relatively rigid container wall 118. The membranes are preferably dispensed from the building material, but may be constructed from other material.

Figures 6A, 6B:
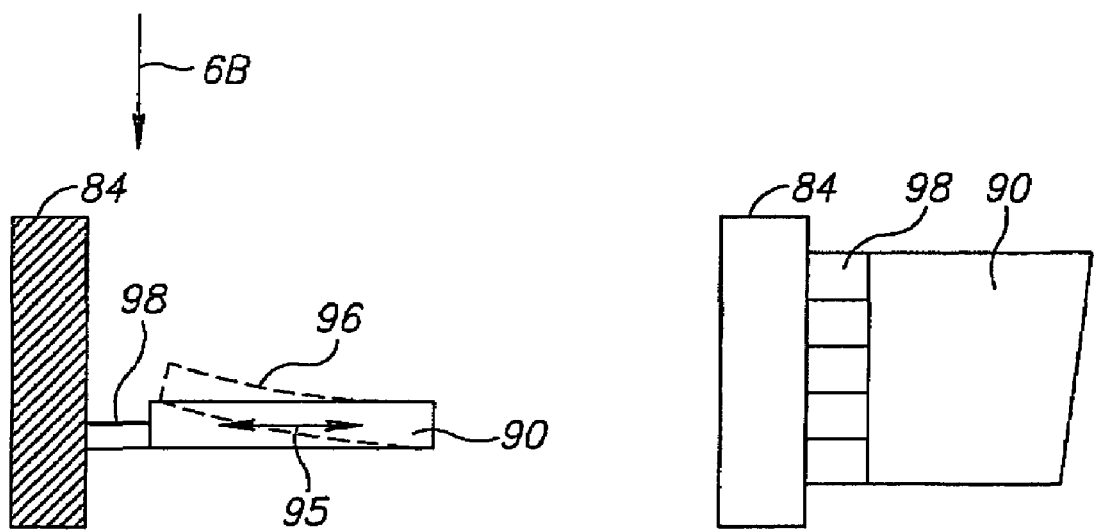
FIG. 6-A is an enlarged detail of part of a container and a membrane forming the support structure of FIG. 5.

The linkage of said membranes 128, 130 and 132 to the container wall 118 may be continuous or by serrations 98, as shown in FIGS. 6A and 6B, or may be by other methods.

Membranes 130 and 132 are also forming the lower layer of islands 114 and 116.

Figures 8A, 8B:
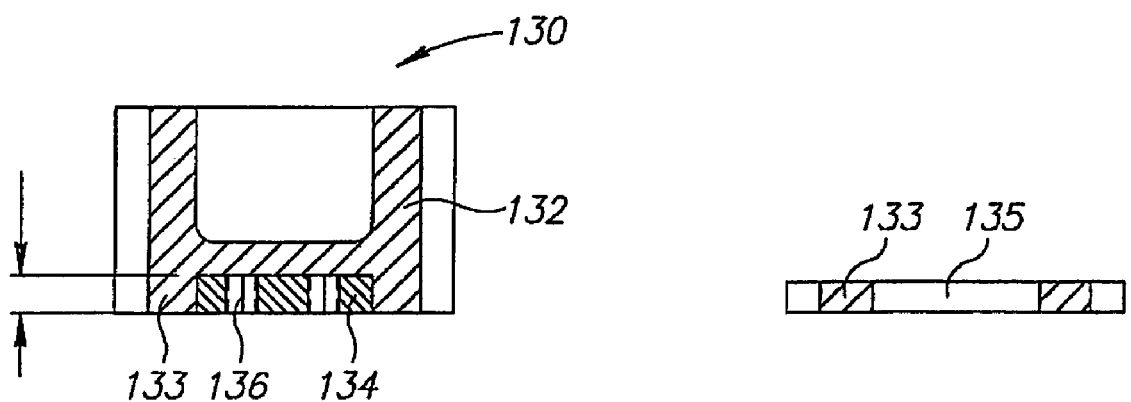
FIG. 8-A is a model containing a flat insert according to an embodiment of the present invention.

Refer now to FIG. 8-A which is an embodiment of a 3-D model 130 comprising a cured BM part 132 and an insert 134. The insert 134 may be produced from a third material such as metal, plastic, wood or any other suitable material, or may be produced from build material, support material, or release material. The insert is preferably more rigid than the liquid or semi-liquid materials used to form the build object and support structures. According to an embodiment of the present invention, a plate 134 having threads 136, is inserted in the model, although any other suitable form could be used.

The method of producing a model such like 130, is by first dispensing the lower layers of the model 133, as shown in FIG. 8-B (the container not shown), where the recess 135 is left uncured or filled with SM. The recess 135 may be built slightly larger than the insert 134. When the lower part of the model 133 has attained a thickness of the insert 'T', the recess 135 is emptied from the Uncured material, the insert 134 is inserted and the dispensing continues, filling the gaps between the cured part 133 and the insert 134.

Reference is made now to FIG. 9-A which is still another embodiment of a method of producing a 3-D model having an embedded graduated insert 144.

The method of producing such a 3-D model is similar to that shown in FIG. 8-A: the lower part of the model 142 is dispensed as shown in FIG. 9-B, forming a recess 145 which is uncured and slightly larger than the insert 146. When the recess 145 has attained the form of the insert 144, the recess is emptied from the uncured support material, the insert 144 is inserted into the recess 145 and dispensing the BM continues.

Reference is made now to FIG. 10-A which is still another embodiment of a method of producing a 3-D model 150 having an embedded skewed insert 154.

The method of producing such a 3-D model is similar to that shown in FIG. 8-A: the lower part of the model 153 is dispensed as shown in FIG. 10-B, forming a recess 155 which is uncured, filled with SM, (not shown) and slightly larger than the insert 154. When the recess 155 has attained the form of the insert 154, the recess is emptied from the SM, the insert 154 is inserted into the recess and dispensing continues.

It will be further appreciated that the present invention is not limited by what has been described hereinabove and that numerous modifications, all of which fall within the scope of the present invention, exist. Rather the scope of the invention is defined by the claims, which follow:

The invention claimed is:

1. A method for building three-dimensional objects, said method comprising:
    dispensing a first material to form at least one three-dimensional object and at least part of a support structure; and
    dispensing a second material to form at least another part of the support structure and a release layer between said three-dimensional object and said support structure,
    wherein said support structure comprises at least one pillar of said first material surrounded by said second material, said pillar not being in contact with said three-dimensional object.

2. The method of claim 1 wherein at least said first material is a photopolymer and at least the three-dimensional object is formed after being irradiated by electromagnetic radiation.

3. The method of claim 1 wherein said second material comprises a photopolymer and the support structure is formed after being irradiated by electromagnetic radiation.

4. The method of claim 1 wherein said release layer comprises a photopolymer and is formed after being irradiated by electromagnetic radiation.

5. The method of claim 1 comprising separating said support structure and release layer from said three-dimensional object.

6. The method according to claim 5 comprising subjecting said support structure and release layer to a solvent causing the support structure and release layer to weaken.

7. The method according to claim 1, where said support structure further comprises a container formed of said first material, said container being capable of confining said second material.

8. The method according to claim 1, further comprising constructing at least one connecting membrane of said first material attached to at least one said pillar.

9. A method for building three-dimensional objects, said method comprising:
    dispensing a curable build material to form a three-dimensional object;
    dispensing a support material to form at least part of a support structure; and
    selectively dispensing the build material to form at least another part of the support structure, said other part comprising at least a container capable of retaining said support material, said support material being at least partly liquid or paste.

10. The method according to claim 9, wherein said container comprises a base, a plurality of walls and an open top.

11. The method according to claim 10, wherein said container comprises at least one nib projecting from at least one of said walls, wherein said at least one nib is capable of restraining the movement of the three-dimensional object.

12. The method according to claim 9, wherein said support structure further comprises at least one pillar of said build material, said support material and said at least one pillar being retained within said container.

13. The method according to claim 9, wherein each of said build material, support material and container are dispensed in layers.

14. The method of claim 1, wherein said support structure comprises a plurality of pillars which are not in contact with said three-dimensional object, said pillars being surrounded by said support material and separated from said three-dimensional object by said release layer.

15. The method according to claim 14, further comprising constructing membranes of said first material between said pillars.

16. The method of claim 1, wherein said at least one pillar comprises a plurality of layers and wherein a topmost layer of said at least one pillar is adjacent to the release layer being between said three-dimensional object and said support structure.

17. The method of claim 1, wherein said second material is at least partly liquid or paste.

* * * * *